UNITED STATES PATENT OFFICE.

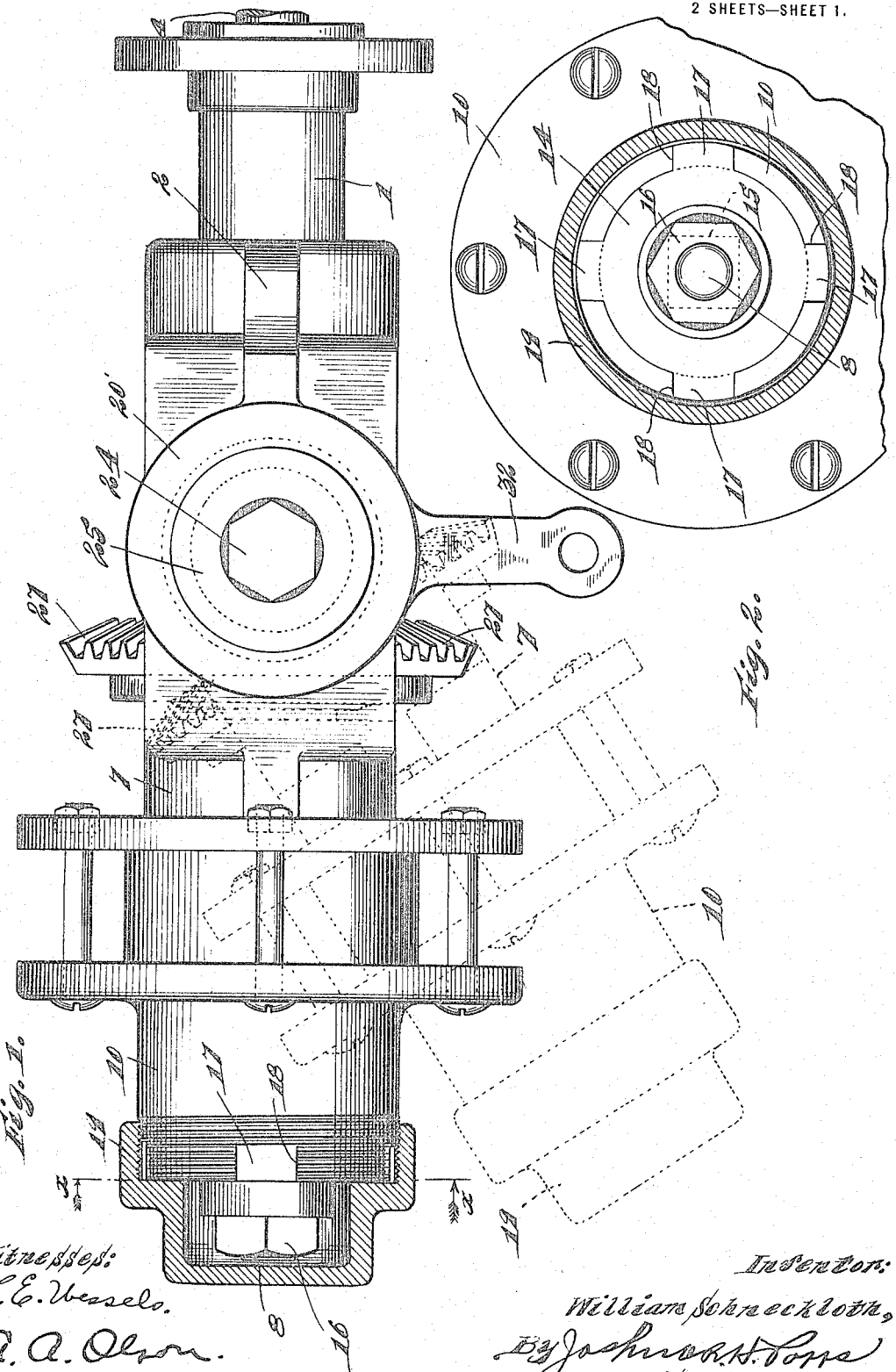

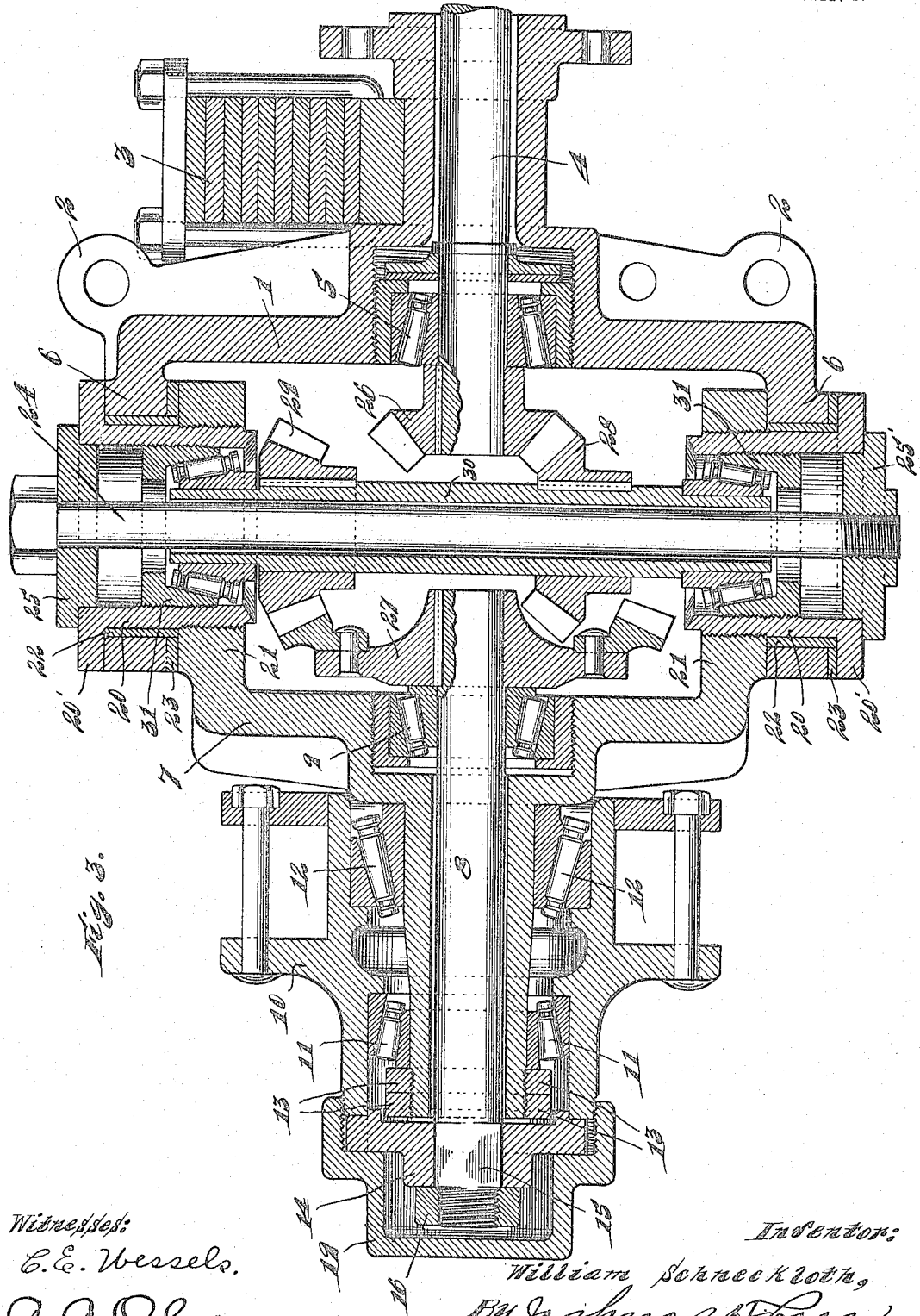

WILLIAM SCHNECKLOTH, OF CHICAGO, ILLINOIS.

STEERABLE DRIVE-GEARING.

1,143,864.  Specification of Letters Patent.  Patented June 22, 1915.

Application filed May 29, 1914. Serial No. 841,771.

*To all whom it may concern:*

Be it known that I, WILLIAM SCHNECK-LOTH, a citizen of the United States, and a resident of the city of Chicago, county of Cook, and State of Illinois, have invented certain new and useful Improvements in Steerable Drive-Gearing, of which the following is a specification.

My invention relates to steerable drive gearing that is gearing designed for use in connection with automobiles or other vehicles so as to permit of steering oscillation of a wheel and at the same time driving of the wheel in the propulsion of the vehicle.

The object of this invention is the production of gearing characterized as above mentioned which will be of durable and economical construction and efficient in operation.

Other objects will appear hereinafter.

With these objects in view my invention consists in the combinations and arrangements of parts hereinafter described and claimed.

The invention will be best understood by reference to the accompanying drawings forming a part of this specification, and in which—

Figure 1 is a top plan view, partly in section, of a steerable drive gearing embodying my invention, Fig. 2 is a section taken on line $x$—$x$ of Fig. 1, and Fig. 3 is a central vertical longitudinal section of the gearing.

The preferred form of construction as illustrated in the drawings comprises a supporting member 1 which, when in use, is stationary, the same being rigidly secured in position by means of tie or brace rods which engage with perforated lugs 2 provided at the respective ends of said member. A vehicle spring 3 is shown arranged in operative proximity with the number 1. Rotatably mounted in the supporting member 1 is a driving shaft 4 the inner end of which, when the device is in use, being connected with the motor or other source of power with which the vehicle is equipped. Provided in the supporting member 1 is a conventional roller bearing 5 which is employed for the obvious purpose of reducing friction. Provided at the upper and lower ends of the member 1 are outwardly projecting vertically alining lugs 6.

Coöperating with the supporting member 1 is a steering knuckle 7 in which is arranged a driven shaft 8 which is mounted in an antifriction roller bearing 9 provided in said knuckle. Arranged upon the outer end of steering knuckle 7 is a wheel hub 10, roller bearings 11 and 12 of conventional design being interposed between said knuckle and hub to alleviate friction. The roller bearing 11 is held in operative position by means of nuts 13 threaded upon the outer end of knuckle 7. The outer end of hub 10 is fixed to the corresponding end of shaft 8 by means of a circular key 14 which is provided centrally with a square perforation snugly engaging over the correspondingly formed portion 15 of said shaft. The key 14 is provided at its periphery with spaced outwardly projecting lugs or ears 17 which engage in correspondingly spaced slots 18 provided in the adjacent end of hub 10. A nut 16 threaded upon the outer end of shaft 8 serves to lock the key 14 in position. With this arrangement it will be seen that the shaft 8 and the hub 10 will be rigidly connected together so that when the former is rotated, corresponding movement will be simultaneously imparted to the latter. A cap nut 19 is threaded upon the outer end of hub 10 to protect the parts which the same incloses.

The lugs 6 of the supporting member 1 are connected with the rearward end of steering knuckle 7 by means of tubular trunnions 20 rotatably mounted in said lugs, the inner ends of said trunnions being threaded into spaced lugs 21 provided at the inner end of said knuckle adjacent the inner sides of said lugs 6. The outer ends of trunnions 20 are formed with outwardly projecting annular flanges 20' for engagement against the outer sides of lugs 6. Bushings 22 are interposed between said trunnions and lugs to take up wear and thrust washers 23 are employed as shown. The trunnions 20 at the opposite ends of supporting member 1 are connected by a tie bolt 24 the respective ends of which engage with heads 25 and 25' arranged at the outer ends of said trunnions, said heads fitting within said ends of said trunnions and also engaging over the outer sides thereof as shown.

With the arrangement set forth it will be seen that the steering knuckle 7 is so connected with the supporting member 1 as to permit of free horizontal or steering oscillation of the former. Through the connection of the trunnions 20 with the lugs 6 and 21 as shown and described and the connection of said trunnions by the tie bolt 24, a rigid unitary construction results whereby when the load is applied to the stationary member 1 the lugs 6 will equally divide the burden so that neither will receive or be subjected to a strain greater than the other. The bushings and thrust washers are so arranged that in case of wear the same may be readily removed and renewed.

The adjacent ends of shafts 4 and 8 are operatively connected by means of bevel gears 26 and 27 provided respectively upon said ends of said shafts, said gears 26 and 27 meshing with bevel gears 28 and 29 respectively fixed to the respective end portions of a tubular shaft 30 mounted in roller bearings 31 which are threaded in the trunnions 20, said shaft 30 being so positioned that the axis thereof is coincident with the axis of oscillation of steering knuckle 7. With this arrangement it will be seen that an operative connection between driving shaft 4 and driven shaft 8 is effected which permits of horizontal or steering oscillation of said driven shaft without affecting the connection thereof with said driving shaft. By mounting the respective ends of the shaft 30 as shown and described the tremendous side or radial thrust of said shaft which results under the stress of a heavy load, will be taken up by the bearing 31, this arrangement eliminating one of the chief objections to gearings of this character where a tubular shaft or sleeve corresponding with the shaft 30 is employed which is comparatively short or which has bearing only at one end. By threading the bearings 31 in the trunnions 20, the former, in case of wear, may be readily adjusted to take up such wear.

Provided at the lower end of the steering knuckle 7 projecting rearwardly from the lower lug 21 thereof is a steering arm 32. This arm, when the device is in use, is connected with the usual spring rods or other mechanism whereby the steering knuckle is manipulated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a steerable drive gearing, the combination of a stationary supporting member having spaced vertically alining lugs; tubular trunnions arranged in said lugs; a steering knuckle having spaced vertically alining lugs at its inner end connected with said trunnions whereby steering oscillation of said knuckle is permitted; a driving shaft rotatably mounted in said supporting member; a driven shaft rotatably mounted in said steering knuckle; an operative connection between adjacent ends of said shafts permitting of steering oscillation of said driven shaft, said connection comprising a vertically disposed tubular shaft arranged with its axis coincident with the axis of oscillation of said steering knuckle; bearings for the respective ends of said vertically disposed shaft in said trunnions; an operative connection between said vertically disposed shaft and said adjacent ends of said driving and driven shafts; and a tie member extending through said vertically extending shaft and connected at its ends with said trunnions, substantially as described.

2. In a steerable drive gearing, the combination of a stationary supporting member having spaced vertically alining lugs; tubular trunnions arranged in said lugs; a steering knuckle having spaced vertically alining lugs at its inner end connected with said trunnions whereby steering oscillation of said knuckle is permitted; a driving shaft rotatably mounted in said supporting member; a driven shaft rotatably mounted in said steering knuckle; an operative connection between adjacent ends of said shafts permitting of steering oscillation of said driven shaft, said connection comprising a vertically disposed tubular shaft arranged with its axis coincident with the axis of oscillation of said steering knuckle; bearings for the respective ends of said vertically disposed shaft in said trunnions; an operative connection between said vertically disposed shaft and said adjacent ends of said driving and driven shafts; heads fitted in and engaging against the outer ends of said trunnions; and a tie member extending through said vertically extending shaft and connected with said head members, substantially as described.

In testimony whereof I have signed my name to this specification in the presence of two subscribing witnesses.

WILLIAM SCHNECKLOTH.

Witnesses:
HAZEL WIGHTMAN,
HENRY H. CHESHIRE.